(12) United States Patent
Samejima (10) Patent No.: US 7,869,893 B2
(45) Date of Patent: Jan. 11, 2011

(54) EXPOSURE APPARATUS

(75) Inventor: Yuichiro Samejima, Tokyo (JP)

(73) Assignee: Canon Kabushiki Kaisha (JP)

( * ) Notice: Subject to any disclaimer, the term of this patent is extended or adjusted under 35 U.S.C. 154(b) by 498 days.

(21) Appl. No.: 11/947,397

(22) Filed: Nov. 29, 2007

(65) Prior Publication Data

US 2008/0133042 A1    Jun. 5, 2008

(30) Foreign Application Priority Data

Dec. 1, 2006  (JP) ............... 2006-325926

(51) Int. Cl.
  *G06F 19/00*  (2006.01)
(52) U.S. Cl. .............. 700/103; 700/100; 700/121
(58) Field of Classification Search ........... 700/103, 700/100, 121
  See application file for complete search history.

(56) References Cited

U.S. PATENT DOCUMENTS 6,282,457 B1 *  8/2001  Miura et al. ............... 700/121
2003/0211410 A1  11/2003  Irie
2006/0055956 A1 *  3/2006  Takahashi et al. .......... 358/1.13

FOREIGN PATENT DOCUMENTS

JP  2006-269669  10/2006
KR  10-2003-0087575 A  11/2003

OTHER PUBLICATIONS

Office Action issued on Apr. 24, 2009 in corresponding Korean Patent Application No. 10-2007-0122669.

* cited by examiner

*Primary Examiner*—Albert Decady
*Assistant Examiner*—Steven R Garland
(74) *Attorney, Agent, or Firm*—Rossi, Kimms & McDowell LLP (57) ABSTRACT

An exposure apparatus includes a plurality of stations and a plurality of substrate stages, and exposes a substrate to radiant energy by executing a plurality of jobs using the plurality of stations and the plurality of substrate stages. The apparatus includes a controller configured to acquire the plurality of jobs, and to determine an execution sequence of the plurality of jobs. One of the plurality of substrate stages includes a measurement unit that is different from any measurement unit included in another of the plurality of substrate stages in what to measure. The controller is configured to determine the execution sequence of the plurality of jobs based on information of respective positions of the plurality of substrate stages, information of measurement units that the plurality of substrate stages respectively have, and information of the measurement units respectively necessary for the plurality of jobs.

4 Claims, 11 Drawing Sheets

INITIAL STATE

AFTER FIRST DETERMINATION

AFTER SECOND DETERMINATION

INITIAL STATE

AFTER FIRST DETERMINATION

AFTER SECOND DETERMINATION

FROM FIG.8A

AFTER THIRD DETERMINATION

AFTER FOURTH DETERMINATION

AFTER FIFTH DETERMINATION

EXPOSURE APPARATUS

BACKGROUND OF THE INVENTION

1. Field of the Invention

The present invention relates to an exposure apparatus having a plurality of stations and a plurality of substrate stages.

2. Description of the Related Art

Exposure apparatuses used for the semiconductor manufacture are required to improve both the measurement accuracy and the throughput. However, conventional exposure apparatuses sequentially execute the measurement and the exposure on one substrate stage. For this reason, these apparatuses consume much time to execute accurate measurement, resulting in a decrease in throughput.

Under the circumstances, an exposure apparatus such as a twin-stage exposure apparatus which has a plurality of substrate stages has been developed. Such an exposure apparatus can, e.g., accurately execute a measurement process on one substrate stage, parallel to an exposure process on the other substrate stage. This makes it possible to simultaneously improve both the measurement accuracy and the throughput.

Such a twin-stage exposure apparatus is disclosed in Japanese Patent Laid-Open No. 2006-269669.

However, since an exposure apparatus having a plurality of substrate stages has processing units that are separately located in a plurality of stations, the substrate stages must be swapped between the plurality of stations. As the substrate stages are frequently swapped, the throughput of the entire apparatus lowers.

SUMMARY OF THE INVENTION

It is an exemplary object of the present invention to improve the throughput of an exposure apparatus which exposes a substrate to radiant energy by executing a plurality of jobs using a plurality of stations and a plurality of substrate stages.

According to the present invention, there is provided an exposure apparatus which includes a plurality of stations and a plurality of substrate stages, and exposes a substrate to radiant energy by executing a plurality of jobs using the plurality of stations and the plurality of substrate stages, the apparatus comprising a controller configured to acquire the plurality of jobs, and to determine an execution sequence of the plurality of jobs, wherein one of the plurality of substrate stages is different from another of the plurality of substrate stages in constituent units thereof, and the controller is configured to determine the execution sequence of the plurality of jobs based on information of respective positions of the plurality of substrate stages, information of constituent units that the plurality of substrate stages respectively have, and information of the constituent units respectively necessary for the plurality of jobs.

According to the present invention, it is possible to, e.g., improve the throughput of an exposure apparatus which executes a job using a plurality of stations and a plurality of substrate stages to expose a substrate to light.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

Figure 1:
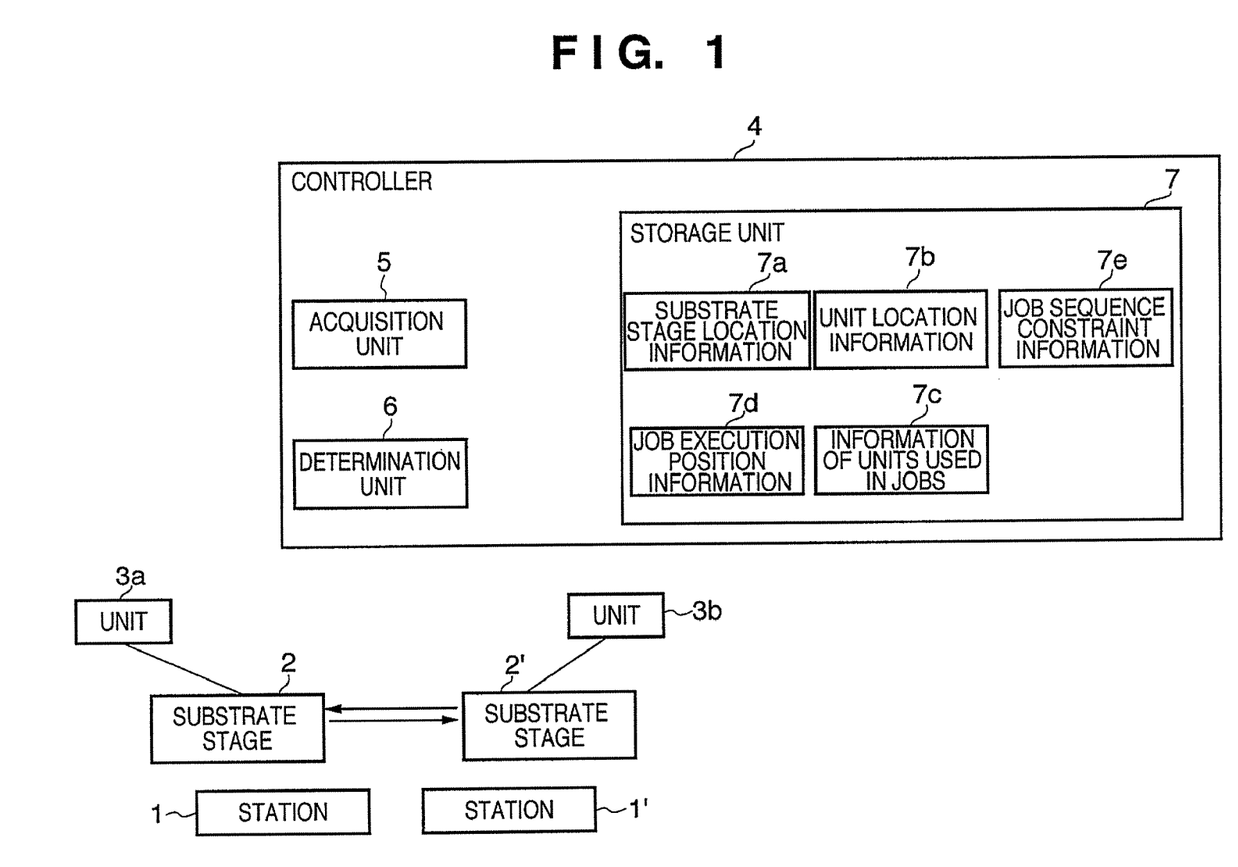
FIG. 1 is a block diagram showing the main arrangement of an exposure apparatus.

FIG. 1 is a block diagram showing a characteristic portion of an exposure apparatus. The exposure apparatus includes a plurality of stations 1 and 1', a plurality of substrate stages 2 and 2' which can freely move between the plurality of stations 1 and 1', and a controller 4. Different units 3 are separately arranged on the plurality of substrate stages 2 and 2'. The plurality of stations 1 and 1' can be, e.g., an exposure station for executing exposure and a measurement station for executing alignment measurement. The units 3 each include a unit 3a arranged on one substrate stage 2, and a unit 3b arranged on the other substrate stage 21. The unit 3a can be, e.g., an illuminometer for a substrate surface, and the unit 3b can be, e.g., a leveling detector.

The controller 4 includes an acquisition unit 5 for acquiring a plurality of jobs to be executed, and a determination unit 6 for determining the execution sequence of the plurality of acquired jobs. A storage unit 7 of the controller 4 can store substrate stage location information 7a, unit location information 7b, information of units used in jobs 7c, job execution position information 7d, and job sequence constraint information 7e. The substrate stage location information 7a indicates stations in which the plurality of substrate stages are located in the initial state of job execution sequence determination. The unit location information 7b indicates units arranged on the respective substrate stages. The information of the units used in the jobs 7c indicates units necessary for the respective jobs. The units necessary for the respective jobs include, e.g., the substrate stage 2, in addition to the units 3. The job execution position information 7d indicates stations in which the respective jobs are executed. The job sequence constraint information 7e indicates a job combination, the execution sequence of which is constrained. In determining the execution sequence of a plurality of jobs, a job combination, the execution sequence of which must not be changed, can be generated depending on the apparatus condition or a user request. The determination unit 6 can determine the job sequence by confirming such a job combination using job sequence constraint information 7e.

Figure 2:
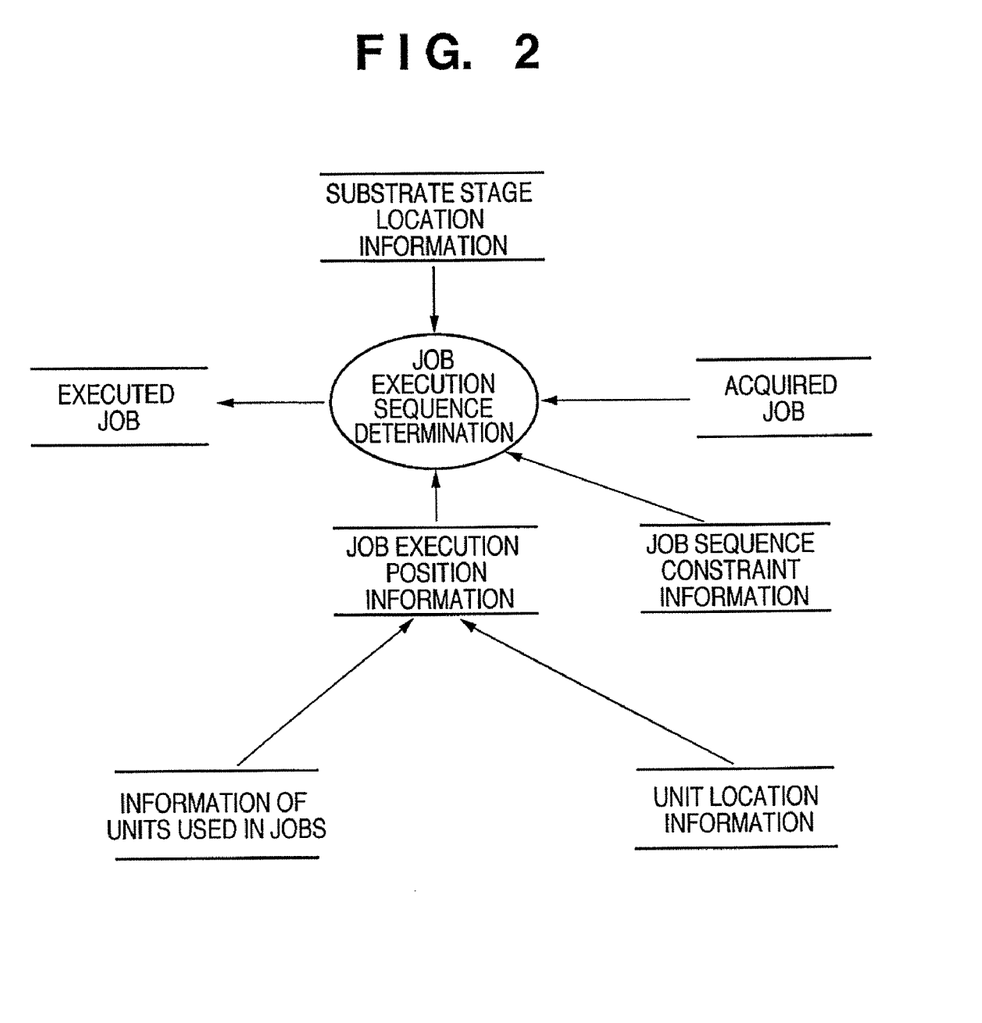
FIG. 2 is a data flow diagram.

FIG. 2 is a data flow diagram according to the present invention. The acquisition unit 5 stores the acquired jobs in the order of acquisition. On the basis of each information stored in the storage unit 7, the determination unit 6 determines the execution sequence of the jobs stored in a requested job field of the acquisition unit 5 in the order of acquisition.

The determination unit 6 stores the jobs in an executed job field of the acquisition unit 5 in accordance with the determined execution sequence.

Figure 3:
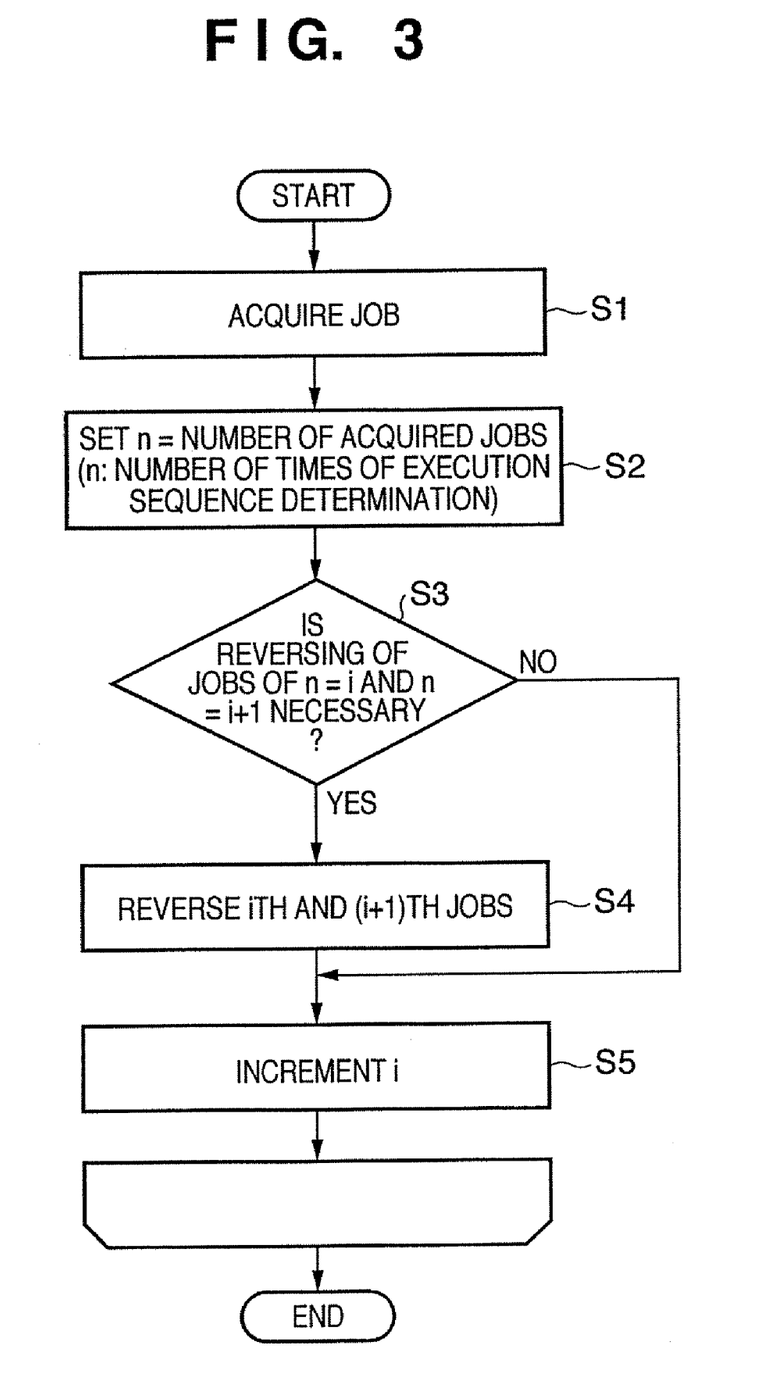
FIG. 3 is a flowchart illustrating a job execution sequence determination process.

FIG. 3 is a flowchart illustrating a job execution sequence determination process by the determination unit 6. In step S1, a job to be executed, which is stored in the requested job field of the acquisition unit 5, is extracted. In step S2, a number n of jobs, the execution sequence of which is to be determined, is set. It is determined in step S3 whether the execution sequence of the first and second jobs in the order of acquisition must be reversed. This determination is based on the location (substrate stage location information 7a) of the plurality of substrate stages in the initial state, and the job execution position (job execution position information 7d). The job execution position can be acquired from the location of the plurality of units (unit location information 7b) and units necessary for the jobs (information of the units used in the jobs 7c). If a job combination, the execution sequence of which is constrained, is present, the determination unit 6 also confirms the job sequence constraint information 7e. The determination unit 6 determines the job execution sequence so as to minimize the number of times of swapping of the substrate stages. If the determination unit 6 determines in step S3 that the job execution sequence must be reversed, in step S4 the first and second jobs in the order of acquisition are reversed to determine the first job in the execution sequence. When the first job in the execution sequence is determined, in step S5 the numbers of jobs, the necessity of reversing the execution sequence of which is to be determined, in the order of acquisition are decreased by one and shifted one by one. If it is determined in step S3 that the job execution sequence need not be reversed, the process skips to step S5. In this way, the execution sequence is sequentially determined for the second and third jobs in the order of acquisition, the third and fourth jobs in the order of acquisition and so on to determine the order of jobs in the execution sequence. The determination unit 6 stores the jobs in the executed job field of the acquisition unit 5 in accordance with the determined execution sequence. When the execution sequence is determined for all of the n acquired jobs, the job execution sequence determination process is completed.

Figure 4:
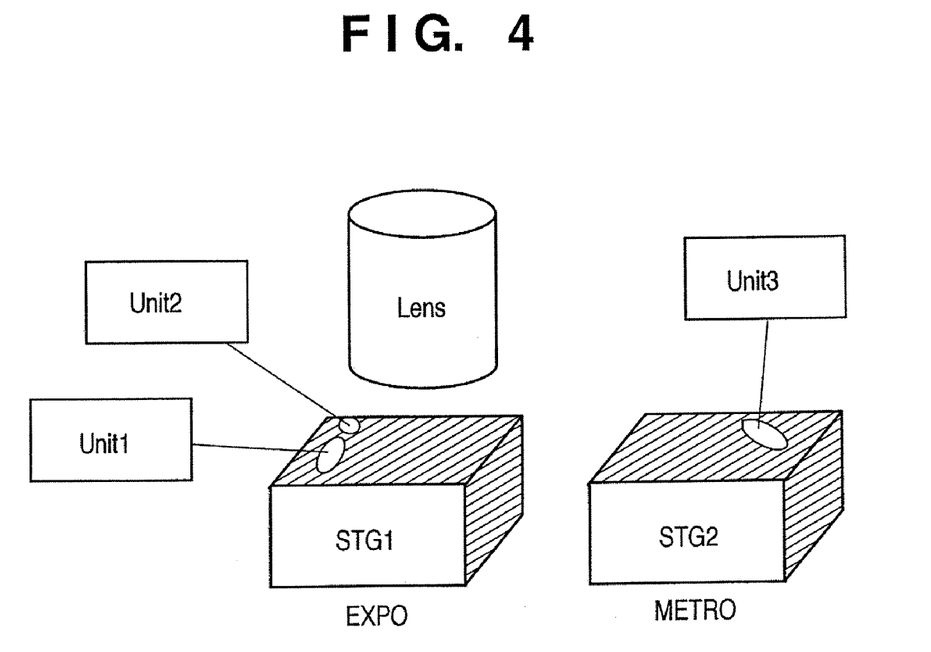
FIG. 4 is a diagram showing the configuration around substrate stages of an exposure apparatus.

FIG. 4 is a diagram showing the configuration of hardware around substrate stages of an exposure apparatus according to one embodiment. The exposure apparatus includes two substrate stages STG1 and STG2. In the initial state, the substrate stage STG1 is located in an exposure station EXPO, while the substrate stage STG2 is located in a measurement station METRO. Two units, i.e., Unit1 and Unit2 are arranged on the substrate stage STG1, while Unit3 is arranged on the substrate stage STG2. The positions of the two substrate stages STG1 and STG2 are swapped between the exposure station EXPO and the measurement station METRO by a job called a swap.

First Embodiment of Job Reversing

Figure 5:
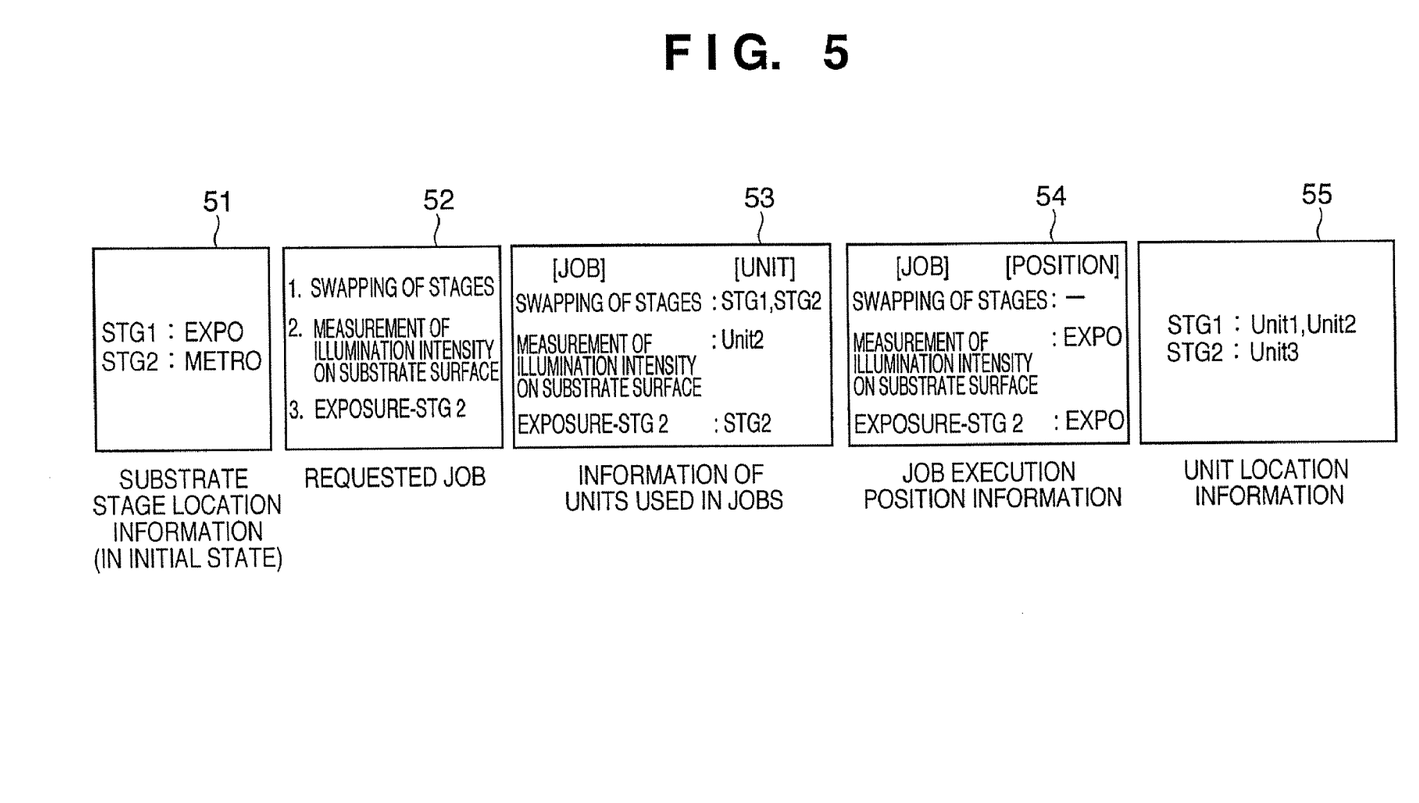
FIG. 5 is a view showing an example of the contents of each information in exposing one substrate to light.
Figure 6:
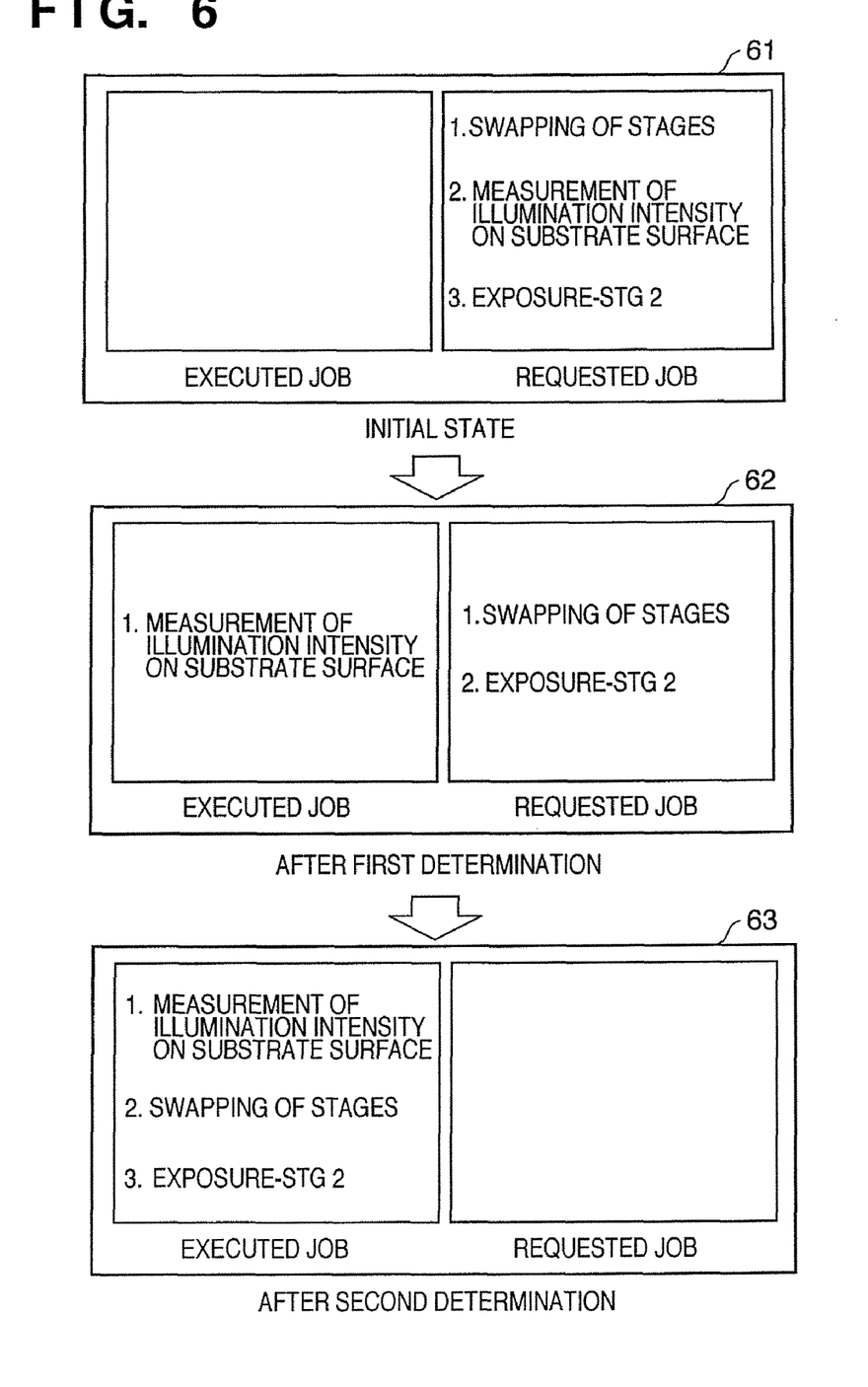
FIG. 6 is a view showing job execution sequence determination in exposing one substrate to light.

FIG. 5 shows an example of the practical values of each information stored in a storage unit 7 when the exposure apparatus having the arrangement shown in FIG. 4 exposes one substrate to light. Reference numeral 51 indicates a practical example of substrate stage location information in the initial state; 52, that of a requested job field; 53, that of information of units used in jobs; 54, that of job execution position information; and 55, that of unit location information. This embodiment assumes that no job combination, the execution sequence of which is constrained, is present. FIG. 6 shows the determination of the execution sequence of jobs in the requested job field of the example shown in FIG. 5. Reference numeral 61 indicates the initial states of the requested job field and an executed job field; 62, the states of the requested job field and the executed job field after the first job reversing determination; and 63, the states of the requested job field and the executed job field after the second job reversing determination.

Assume that a substrate stage STG1 is located on the EXPO side and mounts a substrate in the initial state. The requested job field 52 stores three jobs, i.e., the swapping of substrate stages STG, the measurement of the illumination intensity on a substrate surface, and the exposure on a substrate stage STG2 (61). The execution sequence of these jobs is determined as follows. First, it is determined whether to execute the swapping of the stages STG or the measurement of the illumination intensity on the substrate surface. Referring to the unit location information 55 and the information of the units used in the jobs 53, the swapping of the stages STG can be executed for the stages STG1 and STG2 irrespective of the station positions of the stages STG. Referring to the information of the units used in the jobs 53, Unit2 is necessary for measuring the illumination intensity on the substrate surface. Referring to the unit location information 55, Unit2 is arranged on the stage STG1. The stage STG1 is located on the EXPO side in the initial state. For these reasons, when the stages STG are swapped first, the stage STG1 moves to the METRO side. This makes it necessary to swap the stages STG again to measure the illumination intensity on the substrate surface. On the basis of a determination criterion that the number of times of swapping of the stages STG should be minimized, a determination unit 6 determines that the illumination intensity on the substrate surface must be measured before the swapping of the stages STG. Consequently, the determination unit 6 determines that the job to be executed first is the measurement of the illumination intensity on the substrate surface, in accordance with the first determination for determining the execution sequence of the first and second requested jobs (62). Next, the execution sequence of the swapping of the stages STG as the second job and the exposure on the stage STG2 as the third job is determined. The stage STG1 is located on the EXPO side in executing the second job. The stage STG2 must be located on the EXPO side in the exposure on the stage STG2. For this reason, the stages STG must be swapped before the exposure on the stage STG2. That is, the determination unit 6 determines that jobs to be executed second and third are the swapping of the stages STG and the exposure on the stage STG2, respectively (63).

Although the above-described job execution sequence determination process uses the unit location information 55 and the information of the units used in the jobs 53, job execution position information which reflects the location of a plurality of units can be used in place of these pieces of information.

Second Embodiment of Job Reversing

Figure 7:
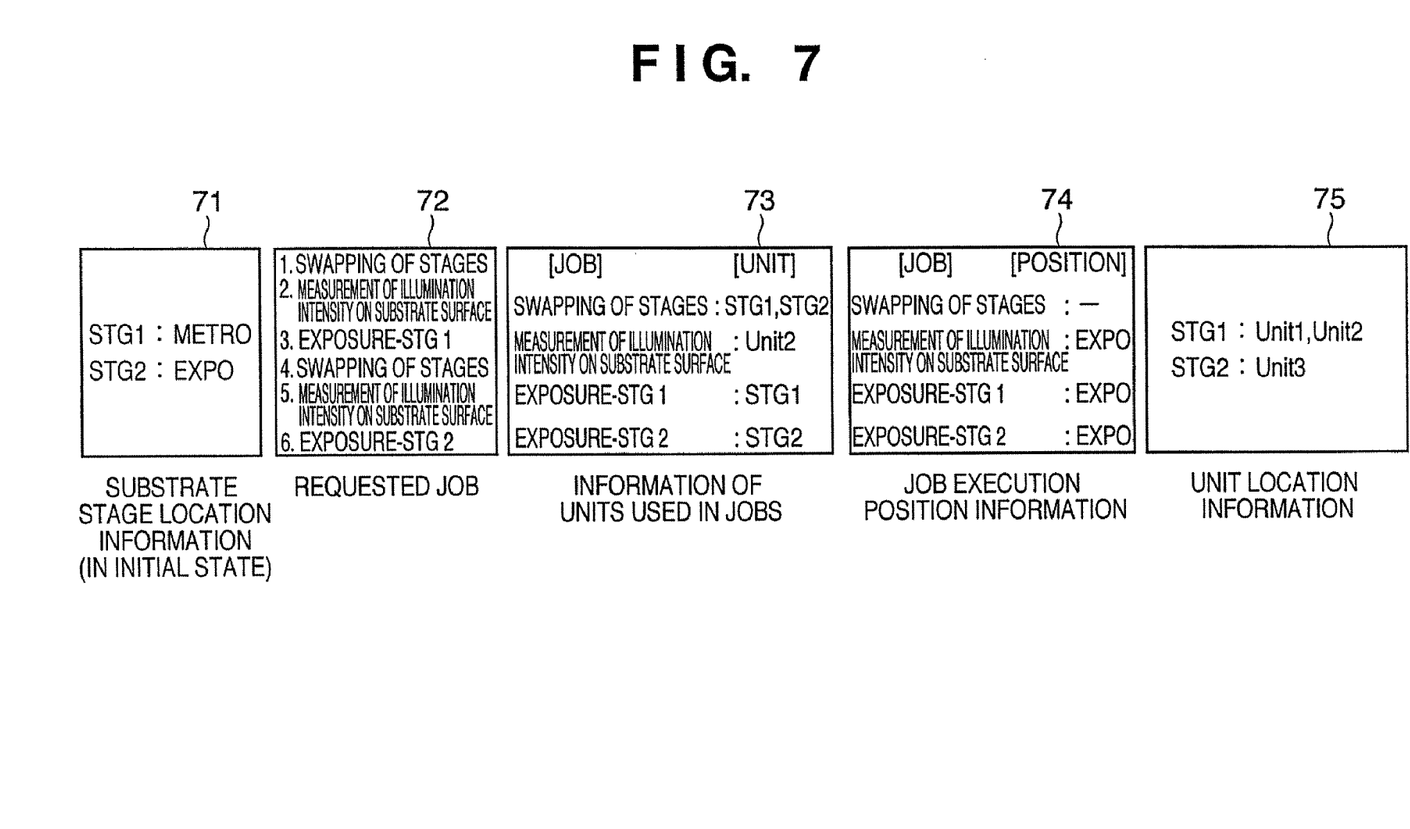
FIG. 7 is a view showing an example of the contents of each information in continuously exposing two substrates to light.
Figure 8A:
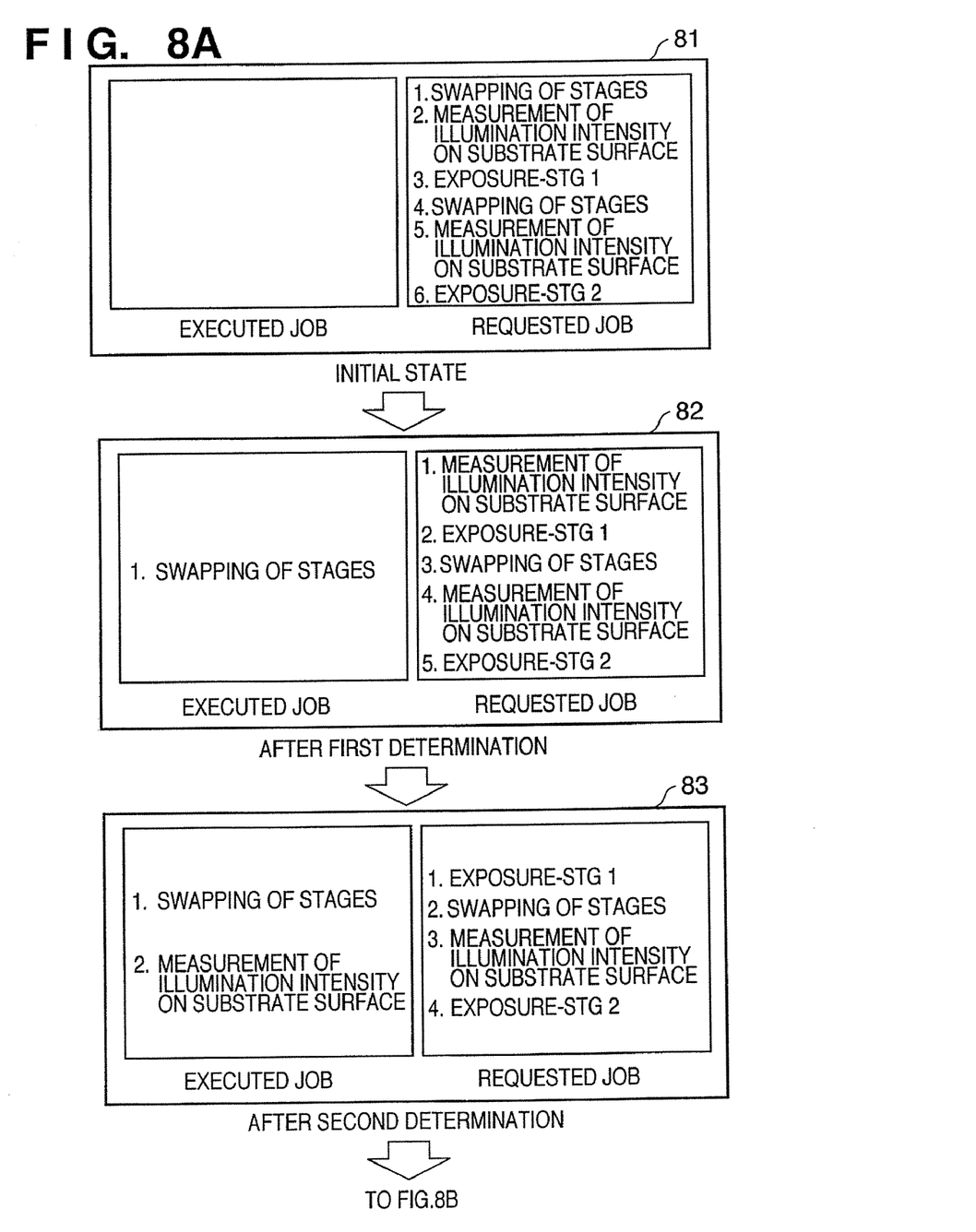
FIGS. 8A and 8B are views showing job execution sequence determination in continuously exposing two substrates to light.
Figure 8B:
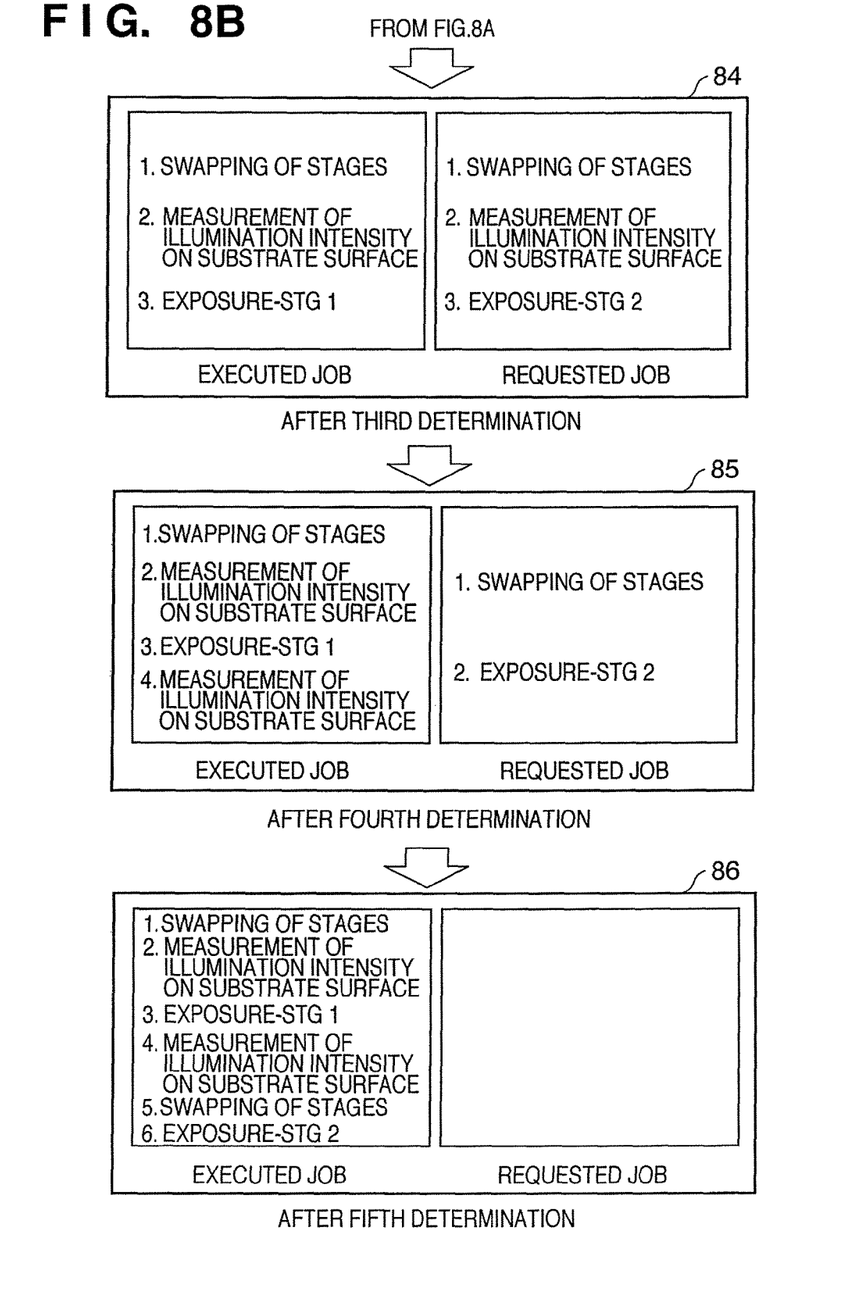

FIG. 7 shows an example of the practical values of each information stored in a storage unit 7 when the exposure apparatus having the arrangement shown in FIG. 4 exposes two substrates to light. Reference numeral 71 indicates a practical example of substrate stage location information in the initial state; 72, that of a requested job field; 73, that of information of units used in jobs; 74, that of job execution position information; and 75, that of unit location information. This embodiment similarly assumes that no job combination, the execution sequence of which is constrained, is present. FIGS. 8A and 8B show the determination of the execution sequence of jobs in the requested job field of the example shown in FIG. 7. Reference numeral 81 indicates the initial states of the requested job field and an executed job field; 82 to 85, the states of the requested job field and the executed job field after the first to fourth job reversing determination, respectively; and 86, the final states of the requested job field and the executed job field after the fifth job reversing determination.

Assume that a substrate stage STG1 is located on the METRO side and mounts a substrate in the initial state. The requested job field 72 stores six jobs, i.e., the swapping of substrate stages STG, the measurement of the illumination intensity on a substrate surface, the exposure on the substrate stage STG1, the swapping of the stages STG, the measurement of the illumination intensity on a substrate surface, and the exposure on a substrate stage STG2 (81). The execution sequence of these jobs is determined as follows. First, it is determined whether to execute first the swapping of the stages STG or the measurement of the illumination intensity on the substrate surface. In this embodiment, the STG1 is located on the METRO side in the initial state. Referring to the information of the units used in the jobs 73 and the unit location information 75, the measurement of the illumination intensity on the substrate surface is a job used while the stage STG1 is located on the EXPO side. A determination unit 6 therefore determines that the stages STG must be swapped before the measurement of the illumination intensity on the substrate surface, and that the job to be executed first is the swapping of the stages STG (82). Next, jobs, the execution sequence of which is to be determined, are the measurement of the illumination intensity on the substrate surface and the exposure on the stage STG1. Referring to the information of the units used in the jobs 73 and the unit location information 75, both the jobs can be executed as long as the stage STG1 is located on the EXPO side, so it is determined not to reverse the execution sequence. The determination unit 6 therefore determines that the job to be executed second is the measurement of the illumination intensity on a substrate surface (83). The job to be executed third is one of the exposure on the stage STG1 and the swapping of the stages STG. Referring to the information of the units used in the jobs 73 and the unit location information 75, the stage STG1 must be located on the EXPO side in the exposure on the stage STG1, and it is located on the EXPO side in executing the third job. It is therefore determined that the exposure on the stage STG1 must be executed before the swapping of the stages STG. Consequently, the determination unit 6 determines that the job to be executed third is the exposure on the stage STG1 (84). The job to be executed fourth is one of the swapping of the stages STG and the measurement of the illumination intensity on the substrate surface. At this time, since the stage STG1 is located on the EXPO side, the illumination intensity on the substrate surface must be measured before the swapping of the stages STG. Consequently, the determination unit 6 determines that the job to be executed fourth is the measurement of the illumination intensity on the substrate surface (85). The job to be executed fifth is one of the swapping of the stages STG and the exposure on the stage STG2. The stage STG2 must be located on the EXPO side in the exposure on the stage STG2, but it is located on the METRO side in executing the fifth job. For this reason, the stages STG must be swapped before the exposure on the stage STG2. Consequently, the determination unit 6 determines that the job to be executed fifth is the swapping of the stages STG and that the job to be executed sixth is the exposure on the stage STG2 (86).

Although the above-described job execution sequence determination process uses the unit location information 75 and the information of the units used in the jobs 73, the job execution position information 74 which reflects the location of a plurality of units can be used in place of these pieces of information.

Examples of the timing at which the execution sequence of a plurality of jobs is determined are the timing at which a predetermined number of jobs are stored in the requested job field of the acquisition unit 5, and the timing at which a mechanism that is separately provided and instructs the execution sequence determination timing issues an instruction.

Embodiment of Manufacture of Device

Figure 9:
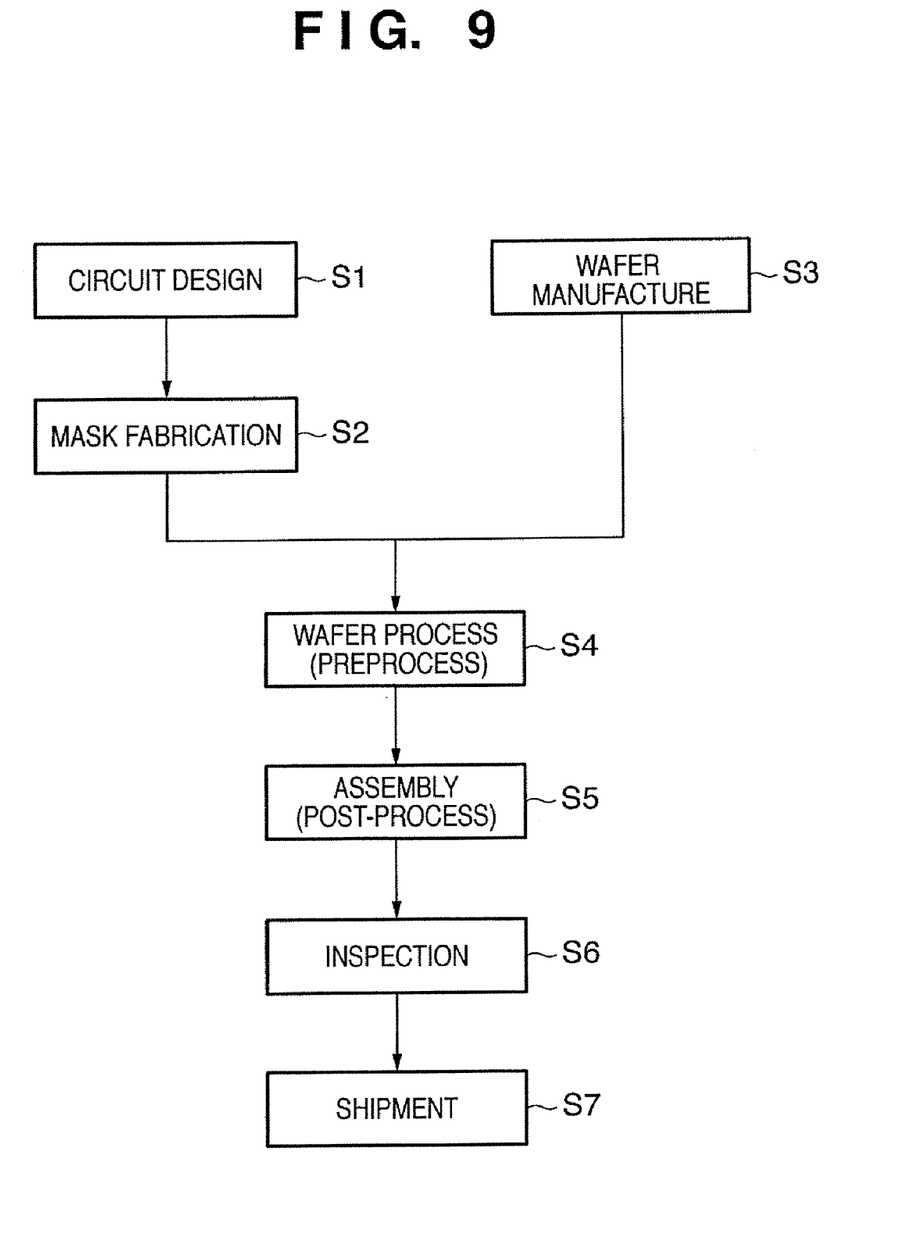
FIG. 9 is a flowchart for explaining the device manufacture using the exposure apparatus.

An embodiment of a method of manufacturing a device using the above-described exposure apparatus will be explained next with reference to FIGS. 9 and 10. FIG. 9 is a flowchart for explaining the manufacture of a device (e.g., a semiconductor chip such as an IC or LSI, an LCD, or a CCD). A semiconductor chip manufacturing method will be exemplified here.

In step S1 (circuit design), the circuit of a semiconductor device is designed. In step S2 (mask fabrication), a mask (also called a master or reticle) is fabricated on the basis of the designed circuit pattern. In step S3 (wafer manufacture), a wafer (also called a substrate) is manufactured using a material such as silicon. In step S4 (wafer process) called a pre-process, the above-described exposure apparatus forms an actual circuit on the substrate by lithography using the mask and substrate. In step S5 (assembly) called a post-process, a semiconductor chip is formed using the substrate manufactured in step S4. This step includes an assembly step (dicing and bonding) and packaging step (chip encapsulation). In step S6 (inspection), the semiconductor device manufactured in step S5 undergoes inspections such as an operation confirmation test and durability test. After these steps, the semiconductor device is completed and shipped in step S7.

Figure 10:
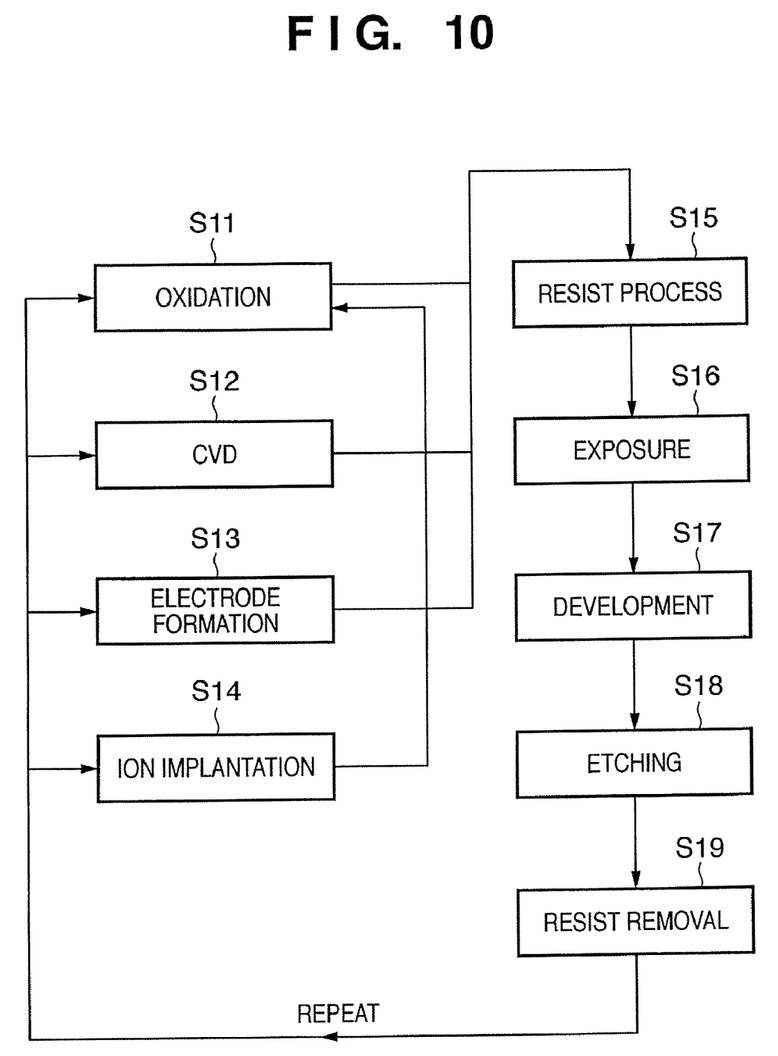
FIG. 10 is a flowchart illustrating details of step S4 (wafer process) in FIG. 9.

FIG. 10 is a flowchart illustrating details of the wafer process in step S4. In step S11 (oxidation), the substrate surface is oxidized. In step S12 (CVD), an insulating film is formed on the substrate surface. In step S13 (electrode formation), an electrode is formed on the substrate by deposition. In step S14 (ion implantation), ions are implanted into the substrate. In step S15 (resist process), a photosensitive agent is applied to the substrate. In step S16 (exposure), the substrate is exposed to light via the circuit pattern of the mask using the above-described exposure apparatus. In step S17 (development), the exposed substrate is developed. In step S18 (etching), portions other than the developed resist image are etched. In step S19 (resist removal), any unnecessary resist remaining after etching is removed. By repeating these steps, a multilayered structure of circuit patterns is formed on the substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-325926, filed Dec. 1, 2006, which is hereby incorporated by reference herein in its entirety.

What is claimed is:

1. An exposure apparatus which includes a plurality of stations and a plurality of substrate stages, and exposes a substrate to radiant energy by executing a plurality of jobs using the plurality of stations and the plurality of substrate stages, the apparatus comprising:

a controller configured to acquire the plurality of jobs, and to determine an execution sequence of the plurality of jobs,     wherein one the plurality of substrate stages includes a measurement unit that is different from any measurement unit included in another of the plurality of substrate stages in what to measure, and the controller is configured to determine the execution sequence of the plurality of jobs based on information of respective positions of the plurality of substrate stages, information of measurement units that the plurality of substrate stages respectively have, and information of measurement units respectively necessary for the plurality of jobs.

2. An apparatus according to claim 1, wherein the controller is configured to determine the execution sequence of the plurality of jobs further based on information of a job combination of which execution sequence is constrained.

3. An apparatus according to claim 1, wherein the controller is configured to store the plurality of jobs in an order acquisition thereof, and to change the order of the plurality of jobs to determine the execution sequence of the plurality of jobs so as to decrease number of times of swapping of the plurality of substrate stages at the plurality of stations.

4. A method of manufacturing a device, the method comprising:

exposing a substrate to radiant energy using an exposure apparatus which includes a plurality of stations and a plurality of substrate stages, and exposes a substrate to radiant energy by executing a plurality of jobs using the plurality of stations and the plurality of substrate stages, providing a controller configured to acquire the plurality of jobs, and to determine an execution sequence of the plurality of jobs, providing one the plurality of substrate stages which a measurement unit that is different from any measurement unit included in another of the plurality of substrate stages in what to measure, and configuring the controller to determine the execution sequence of the plurality of jobs based on information of respective positions of the plurality of substrate stages, information of measurement units that the plurality of substrate stages respectively have, and information of measurement units respectively necessary for the plurality of jobs;

developing the exposed substrate; and processing the developed substrate to manufacture the device.

\* \* \* \* \*